United States Patent [19]

Hirth

[11] Patent Number: 4,726,812
[45] Date of Patent: Feb. 23, 1988

[54] METHOD FOR ELECTROSTATICALLY CHARGING UP SOLID OR LIQUID PARTICLES SUSPENDED IN A GAS STREAM BY MEANS OF IONS

[75] Inventor: Michael Hirth, Unterentfelden, Switzerland

[73] Assignee: BBC Brown, Boveri AG, Baden, Switzerland

[21] Appl. No.: 30,361

[22] Filed: Mar. 26, 1987

[30] Foreign Application Priority Data

Mar. 26, 1986 [CH] Switzerland .................... 1208/86

[51] Int. Cl.⁴ .................................................. B03C 3/41
[52] U.S. Cl. .............................................. 55/2; 55/123; 55/137; 55/152
[58] Field of Search ............... 55/2, 5, 123, 137, 152

[56] References Cited

U.S. PATENT DOCUMENTS

| | | | |
|---|---|---|---|
| 3,496,701 | 2/1970 | Oweberg | 55/123 X |
| 3,957,374 | 5/1976 | Kriese et al. | 55/154 X |
| 4,071,334 | 1/1978 | Kolb et al. | 55/2 |

Primary Examiner—Kathleen J. Prunner
Attorney, Agent, or Firm—Oblon, Fisher, Spivak, McClelland & Maier

[57] ABSTRACT

A method for electrostatically charging up particles suspended in a gas stream by means of ions originating from a separate unipolar ion source, wherein the ions are injected into the gas/particle stream by means of an alternating field and are deposited on the particles. The frequency of the alternating field is chosen so high at the specified maximum field strength that the drive velocity of the ions during a half-cycle is insufficient to carry the ions to the counter-electrode. As a result, undesirable wall recombination of the ions is avoided.

5 Claims, 1 Drawing Figure

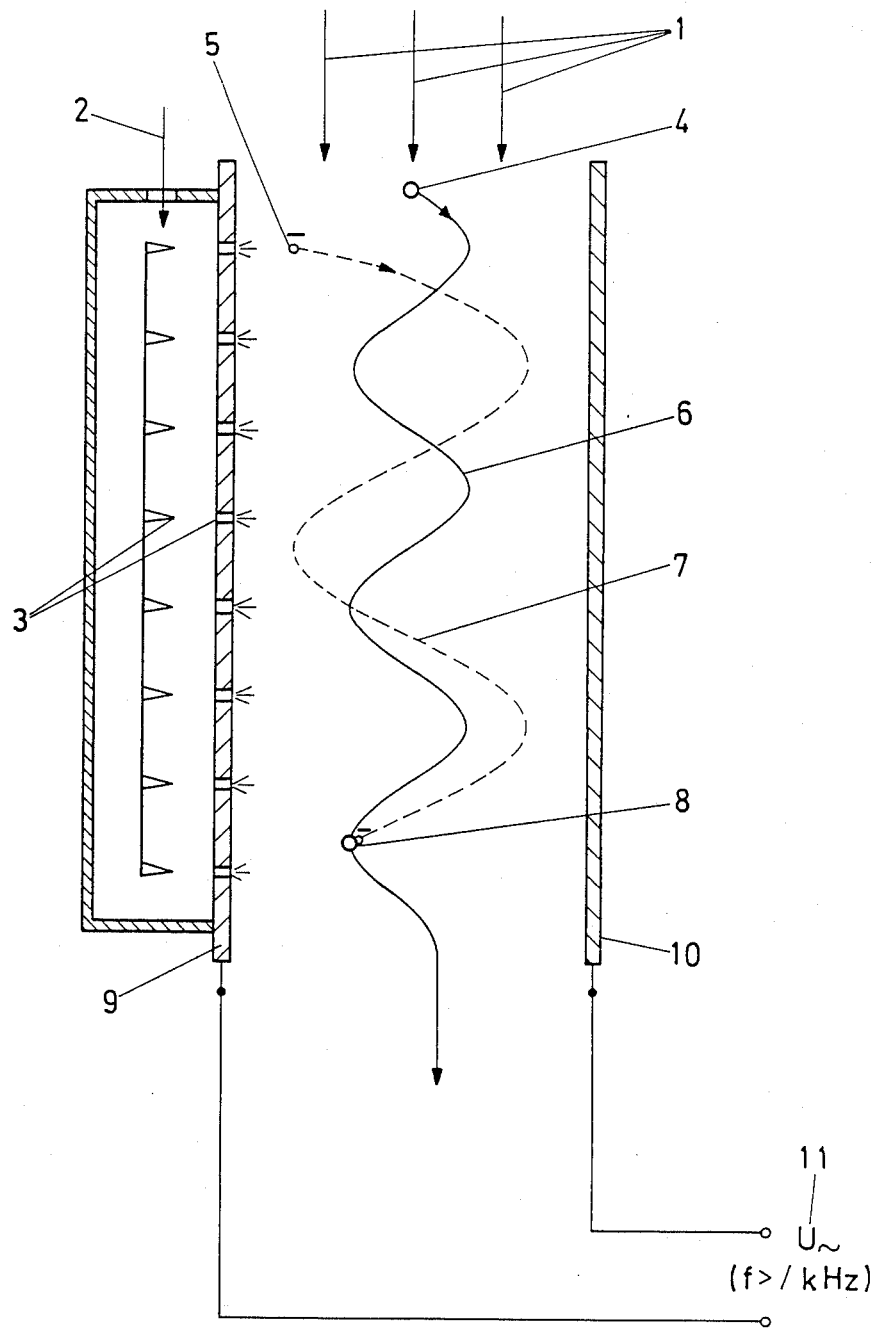

METHOD FOR ELECTROSTATICALLY CHARGING UP SOLID OR LIQUID PARTICLES SUSPENDED IN A GAS STREAM BY MEANS OF IONS

BACKGROUND OF THE INVENTION

1. Field of the Invention

The invention is based on a method for electrostatically charging up solid or liquid particles suspended in a gas stream.

2. Discussion of Background

In electrostatic dust filters, the nature and manner of the electrical charging plays an important role. Inter alia, they are determining factors for the dimensioning and mode of operation of the filters. If dust is to be charged up electrically this is done, as a rule, by passing a corona discharge through it. The maximum achievable charge is then proportional to the applied field strength, and the rate of charging up is proportional to the ion density. As a rule a high charge is desired, and there must therefore be a high field strength.

However, this has consequences in two respects:

(a) The ion density falls since the drift velocity increases with the field strength. This results in a longer charging time (larger equipment, poorer ion utilization factor since the probability of collision with the particles decreases, from which an energy loss accures).

(b) The charged particles are subject to a deflection force proportional to the field which attracts the particles to the wall and results in their deposition.

Arrangements have already been proposed in which the gas stream loaded with particles is first passed through a device with corona discharge and then between two parallel plates to which an electrical alternating field is applied. In this process the intention is to achieve an agglomeration as a result of particles of different size and velocity striking each other. The frequencies of the alternating field in this case are substantially below 1 kHz (cf. Kobashi and Masaaki, "Particle agglomeration induced by alternating electric fields", Degree date 1979, University microfilms international, 300 N. Zeeb Road, Ann Arbor, Mi 48106.

These violent methods and devices do not achieve the object in an optimum manner. The expenditure is considerable in terms of volume and costs. There is therefore a need to simplify and to refine the existing methods.

SUMMARY OF THE INVENTIION

Accordingly, one object of this invention is to provide a novel method for electrostatically charging up particles suspended in a gas stream, which method makes the use of high field strengths possible and results in high ion utilization factors. Furthermore, another object is to avoid dust deposition in the charging space if possible and to keep the dimensions of the latter small. Yet another object is to provide devices designed according to the method which are simple in their construction and reliable.

These and other objects are achieved according to the invention by providing a new and improved method for electrostatically charging up solid or liquid particles suspended in a gas stream by means of ions, wherein ions originating from a separate, independent unipolar ion source are injected into the gas/particle stream by means of an electrical alternating field situated transversely to the flow direction such that the frequency of the alternating field at the specified maximum field strength is chosen so high that the drift velocity of the ions during a half-cycle is insufficient to propel the ions to the counter-electrode and discharge the ions there as a result of wall recombination.

BRIEF DESCRIPTION OF THE DRAWINGS

A more complete apreciation of the invention and many attendant advantages thereof will be readily obtained as the same becomes better understood by reference to the following detailed description when considered in connection with the accompanying drawing, which is a schematic longitudinal view, partially in cross-section, illustrating an apparatus employing the method of the invention.

DESCRIPTION OF THE PREFERRED EMBODIMENTS

Referring now to the drawing, there is shown a diagrammatic longitudinal section through a charging-up device through which gas loaded with particles is flowing. Reference numeral 1 designates the gas stream, loaded with particles, at the entrance to the device. Reference numeral 2 represents the ionization gas stream (usually air) entering the unipolar ionization source 3. In the present case the ionization source 3 consists of a chamber provided with points and plate for corona discharge. Reference numeral 4 is a particle (solid or liquid) in the gas stream 1. Reference numeral 5 is an ion (labelled with the "minus" sign in the diagram) originating from the ion source 3. Reference numeral 6 represents the path of the particle and reference numeral 7 the path of the ion in the gas stream 1. Reference numeral 8 designates the charged particle after the collison with an ion (with ions). Reference numeral 9 designates the electrode which emits ions and which is provided with holes for them to pass through, while reference numeral 10 represents the corresponding counter-electrode. Reference numeral 11 designates a high-voltage source with an alternating voltage U~ having a frequency f of more than 1 kHz.

Next described is the operation of an exemplary embodiment of the invention.

In the method a duct of rectangular cross-section carrying the gas stream 1 loaded with particles was used. The charging-up device had the following dimensions:

Width=100 mm (determines the field build-up)
Breadth=300 mm
Height=500 mm (effective length for charging up in the flow direction)

The particles 4 consisted of limestone ($CaCO_3$) and had a size of between 1 and 20 $\mu$m. The loading of the gas stream 1 with particles was approx. 5 g/m$^3$ and the mean gas velocity was 10 m/s (corresponding volumetric flow=0.3 m$^3$/s). The wide sides of the device, which functioned as electrodes 9 and 10, consisted of a chromenickel steel (commercial designation V4A), the narrow sides of polyvinyl chloride. The unipolar ion source 3 was formed by the electrode 9 provided with holes and a number of points situated opposite the holes. The holes had a diameter of 1 mm and were disposed on an orthogonal grid of 30 mm×50 mm. Exactly opposite the holes and aligned with their axes, there were situated at a distance of 5 mm the points of the ion source 3. An ionization gas stream 2 in the form of air (quantity=200 l/min) was fed to the latter. The points of the ion source 3 were connected to the negative pole of a direct-current source which could be varied up to a value of 5 kV. The ion-supplying perforated electrode 9 was applied to ground potential, while the counter-electrode 10 was connected to the high-voltage terminal of a transformer (high-voltage source 11) which delivered a sinusoidal voltage U~ of 40 $kV_{rms}$ (approx. 56 kV peak value) at a frequency of 10 kHz. This corresponded to a maximum mean homogeneous field strength of 5.6 kV/cm in the charging space.

In the course of the experiment it was exemplary that even at low ionization voltages of the ion source 3 (far below 5 kV) a high degree of charging of the dust particles in the gas stream 1 could still be achieved. It was further possible to observe that, quite generally, only relatively few particles reached the electrodes and were precipitated there in the case of this method.

The method is not restricted to the exemplary embodiment. The operation should be controlled so that the maximum field strength is at least 1 kV/cm in the charging space at the peak point of the alternating field and that the frequency of the alternating voltage is at least 1 kHz. The alternating field should preferably be locally homogeneous and the maximum field strength may amount to 24 kV/cm (peak value) and the associated frequency should be 1 to 100 kHz. The unipolar ions are advantageously generated in a separate corona discharge in the immediate vicinity of one (9) or both electrodes (9, 10).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for electrostatically charging up solid or liquid particles suspended in a gas stream by means of ions, comprising:
   generating ions from separate, independent unipolar ion sources arranged opposite a counter-electrode and an electrode;
   injecting the ions into the gas/particle stream by applying an electrical alternating field transversely to the flow direction such that the frequency of the alternating field at a specified maximum field strength is chosen so high that the drift velocity of the ions during a half-cycle is insufficient to propel the ions to the counter-electrode and discharge the ions at the counter-electrode as a result of wall recombination.

2. The method as claimed in claim 1, comprising: applying a maximum field strength of at least 1 kV/cm at the peak point of the alternating field and having a frequency of at least 1 kHz.

3. The method as claimed in claim 2, wherein the applied electrical alternating field is locally homogeneous and has a maximum field strength at the peak point of up to 24 kV/cm, and a frequency of 1 kHz to 100 kHz.

4. The method as claimed in claim 1, wherein the generating step comprises:
   generating unipolar ions in the immediate neighborhood of one of the electrodes by a separate corona discharge in an ion source.

5. The method as claimed in claim 1, wherein the generating step comprises:
   generating unipolar ions in the immediate neighborhood of both electrodes by separate corona discharges in respective ion sources.

* * * * *